United States Patent
Toole et al.

(10) Patent No.: US 10,022,607 B1
(45) Date of Patent: Jul. 17, 2018

(54) ROW BOAT FOR ROWING TRAINING

(71) Applicants: Francis J. Toole, Tonawanda, NY (US); Richard S. Gauld, Tonawanda, NY (US)

(72) Inventors: Francis J. Toole, Tonawanda, NY (US); Richard S. Gauld, Tonawanda, NY (US)

( * ) Notice: Subject to any disclaimer, the term of this patent is extended or adjusted under 35 U.S.C. 154(b) by 0 days.

(21) Appl. No.: 15/343,862

(22) Filed: Nov. 4, 2016

Related U.S. Application Data

(60) Provisional application No. 62/250,800, filed on Nov. 4, 2015.

(51) Int. Cl.
*B63H 16/04* (2006.01)
*B63H 16/06* (2006.01)
*A63B 69/06* (2006.01)
*G09B 19/00* (2006.01)

(52) U.S. Cl.
CPC ............ *A63B 69/06* (2013.01); *B63H 16/04* (2013.01); *G09B 19/0038* (2013.01)

(58) Field of Classification Search
CPC ...... B63H 16/04; G09B 19/0038; A63B 69/06
USPC ....... 440/101, 102, 103, 104, 105, 106, 107, 440/108, 109, 110
See application file for complete search history.

(56) References Cited

U.S. PATENT DOCUMENTS

| 1,408,129 | A | * | 2/1922 | Newcomb | B63H 16/06 440/107 |
| 2,117,069 | A | * | 5/1938 | Musante | B63H 16/04 416/83 |
| 2,504,461 | A | * | 4/1950 | Spichler | B63H 16/06 440/107 |
| 2,866,985 | A | | 1/1959 | Blackmore | |
| 2,929,080 | A | | 5/1960 | Daily | |
| 3,179,961 | A | | 4/1965 | Ward et al. | |
| 3,340,552 | A | | 9/1967 | Moye | |
| 4,614,500 | A | | 9/1986 | Miller | |
| 4,842,482 | A | * | 6/1989 | Beckerer, Jr. | B63H 16/04 416/70 R |
| 5,257,594 | A | | 11/1993 | Methven | |
| 6,615,762 | B1 | * | 9/2003 | Scott | B63B 7/04 114/353 |
| 7,748,333 | B2 | | 7/2010 | Pohle | |
| 2007/0209277 | A1 | | 9/2007 | Schuck et al. | |

FOREIGN PATENT DOCUMENTS

CN            203486124 U  *  3/2014

* cited by examiner

*Primary Examiner* — Anthony D Wiest
(74) *Attorney, Agent, or Firm* — Cramer Patent & Design, PLLC; Aaron R. Cramer

(57) ABSTRACT

A row boat for rowing training includes a hull including a bottom and four sidewalls, and a pair of oars connected to opposing sidewalls, each oar including a handle and an oar scoop disposed as an end of the handle, wherein the oars are configured to rotate about a first axis of rotation to move the oars during a pull phase and a flex phase of a rowing stroke, and wherein the oars are configured to rotate about a second axis of rotation to change an angular orientation of the oar scoop in water during the pull phase and the flex phase.

16 Claims, 3 Drawing Sheets

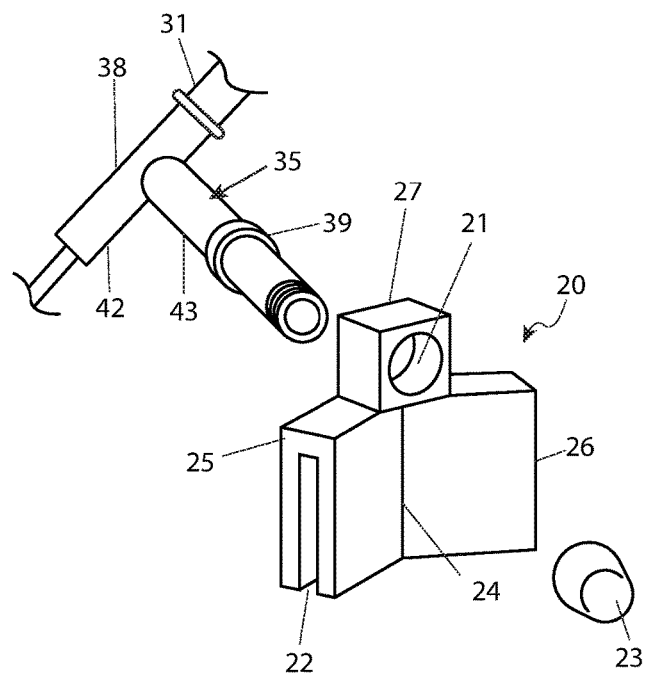
FIG. 2
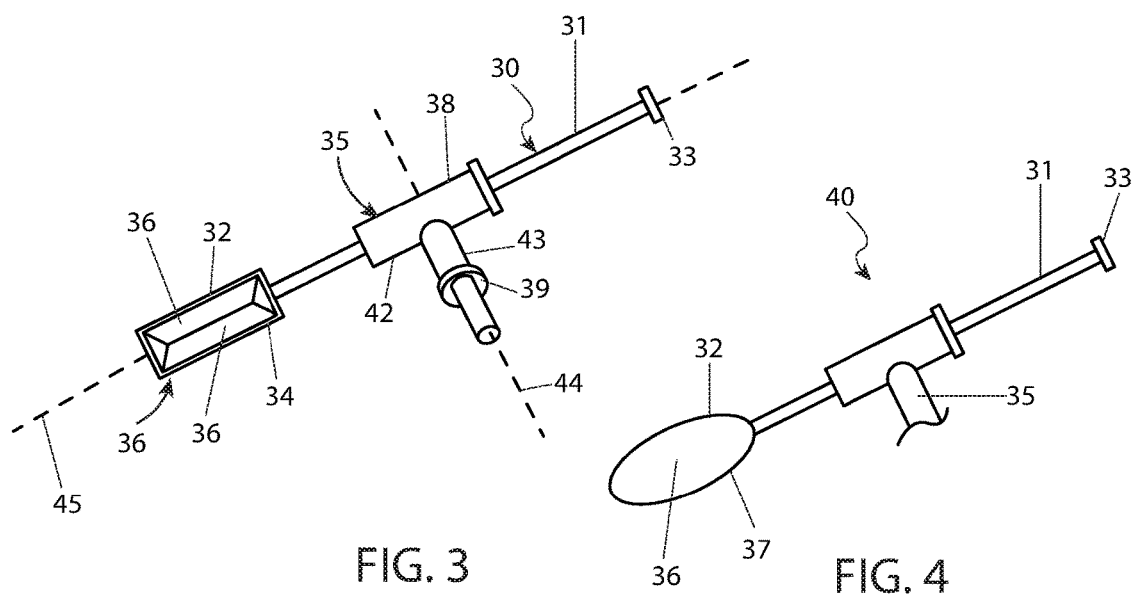
FIG. 3
FIG. 4

ROW BOAT FOR ROWING TRAINING

RELATED APPLICATIONS

The present invention claims the benefit of U.S. Provisional Application No. 62/250,800 filed on Nov. 4, 2015, the entire disclosures of which are incorporated herein by reference.

FIELD OF THE INVENTION

The present invention relates generally to rowing training devices and, more particularly, to a flat bottom row boat for rowing training to develop muscle memory.

BACKGROUND OF THE INVENTION

Many individuals in modern society participate in activities such as boating, exercise or sports for pleasure and to realize health benefits. When participating in any activity, new motor skills and movement combinations are frequently being used and repeated. All activities require some degree of strength, endurance training, and skill in order to be successful in the required tasks. Muscle memory related to strength training involves elements of both motor learning, and long-lasting changes in the muscle tissue. When a movement is repeated over time, a long-term muscle memory is created for that task, eventually allowing it to be performed without conscious effort. This process decreases the need for attention and creates maximum efficiency within the motor and memory systems. This is particularly important in rowing, where stroke consistency is critical to success.

Traditional rowing machines operate by generating resistance to a rowing motion made by the user. Typically, rowing machines are designed such that this rowing motion occurs in the horizontal plane, generally parallel to the surface on which the rowing machine is supported. The rowing motion includes two (2) phases, an extension (or pull) phase and a recoil (or flex) phase, which are performed along a stroke axis. Presumably to simulate an actual rowing motion, the pull phase is typically loaded (or resisted) while the flex phase is not. When actually rowing a boat, the pull phase is resisted by the water while the flex phase is not since the oar is out of the water.

While many individuals participate in rowing training, properly holding ones' stance or maintaining hand motions may prove difficult using traditional rowing equipment and training devices, therefore, participants may have difficulty positioning their stance and hand motions with reliability.

Accordingly, there exists a need for a training device that helps improve an individual's boating skills and build muscle memory for moving oars in a boat.

SUMMARY OF THE INVENTION

In an embodiment, the disclosed device for rowing training includes a hull including a bottom and four sidewalls, and a pair of oars connected to opposing sidewalls, each oar including a handle and an oar scoop disposed as an end of the handle, wherein the oars are configured to rotate about a first axis of rotation to move the oars during a pull phase and a flex phase of a rowing stroke, and wherein the oars are configured to rotate about a second axis of rotation to change an angular orientation of the oar scoop in water during the pull phase and the flex phase.

In another embodiment, the disclosed device for rowing training includes a hull including a flat bottom, a front right sidewall, a back right sidewall, a front left sidewall and a back left sidewall defining a diamond shape, a right oar saddle connected to a right intersection between the front right sidewall and the back right sidewall, wherein the right oar saddle includes a front portion and a back portion disposed at a non-zero angle relative to each other matching an angle of the right intersection, a slot extending upwardly into the front portion and the back portion and configured to receive an upper edge of the right intersection, and an upwardly extending tab including an aperture disposed therethrough, a left oar saddle connected to a left intersection between the front left sidewall and the back left sidewall, wherein the left oar saddle includes a front portion and a back portion disposed at a non-zero angle relative to each other matching an angle of the left intersection, a slot extending upwardly into the front portion and the back portion and configured to receive an upper edge of the left intersection, and an upwardly extending tab including an aperture disposed therethrough, a right oar including a handle, an oar scoop disposed as an end of the handle, a right oar connector disposed at an intermediate location on the handle and connected to the right oar saddle, wherein the right oar connector includes a "T"-shaped fitting including a collar portion configured to retain the handle of the right oar and a stem portion configured to extend through the aperture of the right oar saddle, and a left oar including a handle, an oar scoop disposed as an end of the handle, a left oar connector disposed at an intermediate location on the handle and connected to the left oar saddle, wherein the left oar connector includes a "T"-shaped fitting including a collar portion configured to retain the handle of the left oar and a stem portion configured to extend through the aperture of the left oar saddle, wherein the right oar connector is configured to rotate about a first axis of rotation relative to the right oar saddle to move the right oar during a pull phase and a flex phase of a rowing stroke, wherein the left oar connector is configured to rotate about a first axis of rotation relative to the left oar saddle to move the left oar during the pull phase and the flex phase of the rowing stroke, wherein the right oar is configured to rotate about a second axis of rotation relative to the right oar connector to change an angular orientation of the oar scoop of the right oar in water during the pull phase and the flex phase, and wherein the left oar is configured to rotate about a second axis of rotation relative to the left oar connector to change an angular orientation of the oar scoop of the left oar in the water during the pull phase and the flex phase.

In yet another embodiment, the disclosed device for rowing training includes a hull including a flat bottom, a front right sidewall, a back right sidewall, a front left sidewall and a back left sidewall defining a diamond shape, a right oar including a handle, an oar scoop disposed as an end of the handle, a right oar connector disposed at an intermediate location on the handle and connected to the front right sidewall forward of forward of a right intersection between the front right sidewall and the back right sidewall, wherein the right oar connector includes a "T"-shaped fitting including a collar portion configured to retain the handle of the right oar and a stem portion configured to extend through an aperture disposed through the front right sidewall, a left oar including a handle, an oar scoop disposed as an end of the handle, a left oar connector disposed at an intermediate location on the handle and connected to the front left sidewall forward of a left intersection between the front left sidewall and the back left sidewall, wherein the left oar connector includes a "T"-shaped fitting including a collar portion configured to retain the handle of the left oar and a stem portion configured to extend through an aperture disposed through the front left sidewall, a right clip extending from the front right sidewall and configured to engage the handle of the right oar, and a left clip extending from the front left sidewall and configured to engage the handle of the left oar, wherein the right oar connector is configured to rotate about a first axis of rotation relative to the front right sidewall to move the right oar during a pull phase and a flex phase of a rowing stroke, wherein the left oar connector is configured to rotate about a first axis of rotation relative to the front left sidewall to move the left oar during the pull phase and the flex phase of the rowing stroke, wherein the right oar is configured to rotate about a second axis of rotation relative to the right oar connector to change an angular orientation of the oar scoop of the right oar in water during the pull phase and the flex phase, and wherein the left oar is configured to rotate about a second axis of rotation relative to the left oar connector to change an angular orientation of the oar scoop of the left oar in the water during the pull phase and the flex phase.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 2 is a partial perspective view of an oar saddle and oar connection piece of the disclosed row boat for rowing training;

FIG. 3 is a front perspective view an embodiment of an oar of the disclosed row boat for rowing training;

FIG. 4 is a rear perspective view of another embodiment of the oar of the disclosed row boat for rowing training; and, FIG. 5 is a top view of another embodiment of the disclosed row boat for rowing training.

Figure 1:
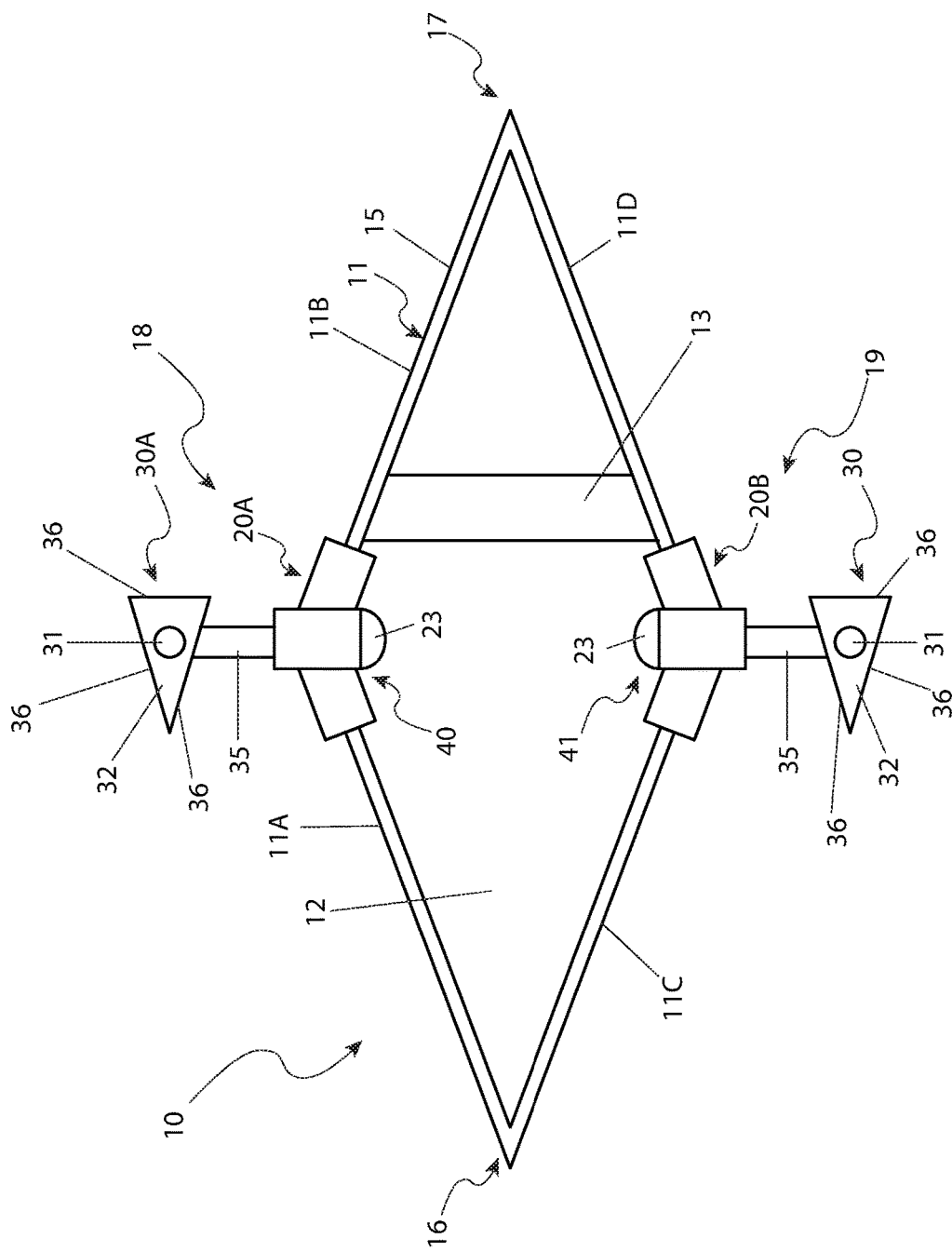
FIG. 1 is a top view of an embodiment of the disclosed row boat for rowing training.

DESCRIPTIVE KEY 10 flat bottom boat
11 sidewalls
11A front right sidewall
11B back right sidewall
11C front left sidewall
11D back left sidewall
12 bottom
13 seat
15 hull
16 front end
17 back end
18 right side
19 left side
20 oar saddle
20A right oar saddle
20B left oar saddle
21 aperture
22 slot
23 fastener
24 seam
25 front portion of oar saddle
26 back portion of oar saddle
27 tab
30 oar
30A right oar
30B left oar
31 handle
32 oar scoop
33 pommel
34 triangular prism body
35 oar connector
36 side of triangular prism body
37 ovular body
38 fitting
39 flange
40 right side intersection
41 left side intersection
42 collar portion of fitting
43 stem portion of fitting
44 first axis of rotation
45 second axis of rotation
46 clip

DETAILED DESCRIPTION OF THE PREFERRED EMBODIMENT

In accordance with the invention, the best mode is presented in terms of an exemplary embodiment, herein depicted within FIGS. 1-5. However, the invention described herein is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

Referring to FIGS. 1-5, disclosing a flat bottom row boat for rowing training, generally referred to herein as the device 10, where like reference numerals represent similar or like parts. The disclosed device 10 is particularly suited for training proper rowing techniques and the development of muscle memory.

The device 10 includes is a specialized boat with a unique shape and oar system to allow for increased maneuverability. In the illustrative embodiments disclosed herein, the boat has a generally diamond shaped and is symmetrical in nature. This allows the boat to be rowed forward or backwards with equally easy effort and no need to turn the boat around. The oars are attached at the outer side points of the boat in captive "V"-shaped saddles. The oars are similar in overall size but are provided with a concave cup structure rather than the flat nature of conventional oars. This feature allows the oars to remain in the water continuously during use. Forward boat motion occurs when the oars are pulled back during the extension (or pull) phase of the stroke. During the recoil (or flex) phase of the stroke, the shape of the oar cuts through the water without noticeably slowing forward movement of the boat. This feature also allows for small or complex turns by turning the concave oars into reverse position by simply rotating them in a manner that traditional oars cannot do. Following the pull phase, a half turn of the oar is required for the flex phase, followed by another half turn before another pull phase, and so on. This motion and action will quickly become second nature allowing for more fluid movement and the development of muscle memory.

FIG. 1 is a schematic illustration of a top plan view of an embodiment of the disclosed device 10. The device 10 includes a relatively small hull 15, or boat body, having four sidewalls 11 and a substantially flat bottom 12. The flat bottom 12 includes a substantially flat surface for contact with the water. The device 10 also includes a pair of oar saddles 20 and a set of oars 30, for example, one oar 30 is associate with each oar saddle 20. The oars 30 are configured to never be above the water line during operation. In other words, the oars 30 remain in the water during the pull phase of the stroke and the flex phase of the stroke. The process of pushing (e.g., extending) and pulling (e.g., recoiling) the oars 30 moves the device 10 (e.g., the hull 15) forward. A first stroke is performed by pulling the oars 30 back during the pull phase of the first stroke. After pulling the oars 30 back during the pull phase of the first stroke, a half turn of the oar 30 is required to push the oars 30 forward during the flex phase of the first stroke. After pushing the oars 30 forward during the flex phase of the first stroke, a half turn of the oar 30 is required to pull the oars 30 back during the pull phase of a second stroke, followed by another half turn to push the oars 30 forward again during the flex phase of the second stroke and so on for additional subsequent strokes. The oarsman will soon develop the muscle memory required for fluid movement during rowing.

In the illustrative embodiments, the hull 15 has an overall generally diamond shape having a bow or front end 16, a stern or back end 17, a starboard or right side 18, and a port or left side 19, for example, being symmetric along both a major axis and a minor axis of the hull 15. The hull 15 includes a hollow inner volume defined by the flat bottom 12 and the set of sidewalls 11. The device 10 also includes one (1) seat 13 connected to the hull 15 within the interior volume for a user to sit.

The hull 15 is propelled by means of the oars 30. In the embodiment illustrated in FIG. 1, the device 10 includes a pair of the oars 30 (e.g., a right oar 30A and a left oar 30B), each oar 30 being removably attached to an associated oar saddle 20 (e.g., a right oar saddle 20 and a left oar saddle 20B) located on the right side 18 and the left side 19 of the hull 15. As an example, the right oar saddle 20A is connected to right sidewalls 11A, 11B at the right side intersection 40 of the front right sidewall 11 and the back right sidewall 11B. The right oar 30A is connected to the right oar saddle 20A. A left oar saddle 20B is connected to left sidewalls 11C, 11D at the left side intersection 41 of the front left sidewall 11C and the back left sidewall 11D. The left oar 30B is connected to the left oar saddle 20B.

FIG. 2 is a schematic illustration of a side perspective view of the oar saddle 20 (e.g., representative of both the right oar saddle 20A and the left oar saddle 20B). Each oar saddle 20 has a generally angular shape and is configured to be coextensive with the angle created by the intersection of two (2) conjoining sidewalls 11 (e.g., the right sidewalls 11A, 11B and the left sidewalls 11C, 11D) of the hull 15 as it forms the diamond shape of the hull 15. A seam 24 formed at the angular intersection between a front portion 25 and a back portion 26 of the oar saddle 20 is in the axial centerline of the oar saddle 20.

Both front portion 25 and the back portion 26 of the oar saddle 20 includes a slot 22 extending upwardly into the oar saddle 20 from a bottom, or lower edge, of the oar saddle 20. The slot 22 is configured for removable placement on an upper edge of the associated sidewall 11.

The oar saddle 20 also includes a tab 27 extending upwardly and generally vertically from the seam 24 between the front portion 25 and the back portion 26. The flange 21 includes an aperture 21 through which an oar connector 35 of the oar 30 extends for connection to the oar saddle 20.

FIG. 3 is a schematic illustration of a side view of an embodiment of the oar 30 (e.g., representative of both the right oar 30A and the left oar 30B). FIG. 4 is a schematic illustration of a side view of another embodiment of the oar 30 (e.g., representative of both the right oar 30A and the left oar 30B). Generally, the oar 30 includes a handle 31 having an oar scoop 32 disposed at a first end and a pommel 33 disposed as an opposed second end. The oar 30 may be formed of any suitable material including, for example and without limitation, wood or plastic.

In the embodiment illustrated in FIGS. 1 and. 3, the oar scoop 32 includes an elongated triangular prism body 34 (e.g., the body 34 of the oar scoop 32 has a triangular prism shape). In an example, each side 36 of the triangular prism body 34 forming the oar scoop 32 is flat. In another example, each side 36 of the triangular prism body 34 forming the oar scoop 32 curved, for example, a convex or concave curve. In yet another example, at least one side 36 of the triangular prism body 34 forming the oar scoop 32 is flat and at least one side 36 of the triangular prism body 34 forming the oar scoop is curved, for example, a convex or concave curve.

In the embodiment illustrated in FIG. 4, alternately, the oar scoop 32 includes an ovular body 38 (e.g., the body 38 of the oar scoop 32 has a generally ovular shape). As examples, the body 38 of the oar scoop 32 may be flat and symmetrical, curved and asymmetrical or have another conventional oar scoop shape.

Referring to FIGS. 1-4, the oar 30 also includes the oar connector 35 disposed at an approximately intermediate (e.g., middle) location of the handle 31. The oar connector 35 is configured to be removably attached to the oar saddle 20. As an example, the oar connector 35 includes a T-shaped fitting 38 connected to or integral with the handle 31. As an example, the fitting 38 includes a collar portion 42 configured to engage or receive the handle 31 of the oar 30 and a stem portion 43 configured to be routed through the aperture 21 formed through the tab 27 and fastened to the oar saddle 20.

Referring to FIG. 2, as an example, the stem portion 43 includes a flange 39 configured to engage an outside surface of the tab 27 when the stem portion 43 is inserted through the aperture 21. A fastener 23 is configured to be engage (e.g., threadingly engage) an end of the stem portion 43 extending through the aperture 21. The fastener 23 is configured to engage an inside surface of the tab 27 when connected to the stem portion 43. Thus, the tab 27 is clamped between the flange 39 and the fastener 23.

Referring to FIGS. 2 and 3, the oar connector 35 is configured to allow the oar 30 to rotate relative to the oar saddle 20 and allow the oar 30 to rotate relative to the fitting 35. As an example, the fitting 35 may rotate about a first axis of rotation 44 relative to the oar saddle 20, thus, allowing the oar 30 to rotate about the first axis of rotation 44. The oar 30 may rotate about a second axis of rotation 45 relative to the fitting 35. As an example, the fitting 38 may allow the handle 31 of the oar 30 to rotate within the collar portion 42. The collar portion 42 may also be configured to limit or prohibit linear movement of the oar 30 relative to the fitting 38. Thus, rotation of the oar 30 about the first axis of rotation 44 may allow for the pull phase and the flex phase of the stroke and rotation of the oar 30 about the second axis of rotation 45 changes the position of the oar scoop 32 in the water during the pull phase and the flex phase, respectively.

Figure 5:
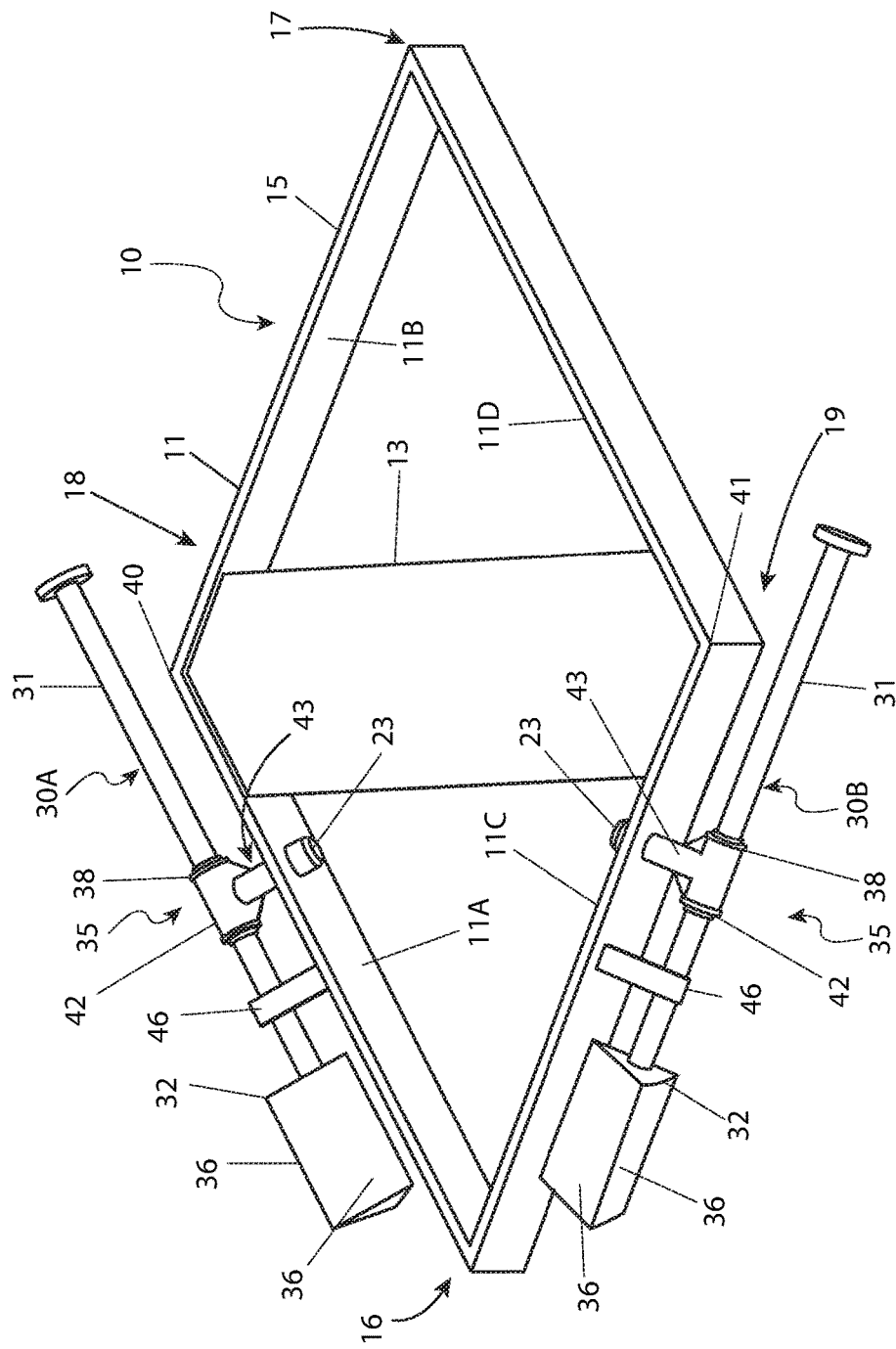

FIG. 5 is a schematic illustration of a top view of another embodiment of the disclosed device 10. In the illustrative embodiment, the oars 30 are connected directly to the hull 15 (e.g., without the need for the oar saddle 20 of the embodiments illustrated in FIGS. 1 and 2). As an example, the right oar 30A is connected to the front right sidewall 11A forward of the right side intersection 40. The left oar 30B is connected to the front left sidewall 11C forward of the left side intersection 41.

As an example, the stem portion 43 of the fitting 38 of each oar connector 35 extends through an aperture (not shown) formed through the respective front sidewall 11A, 11C. The flange 39 (not identified in FIG. 5) is configured to engage an outside of the respective front sidewall 11A, 11B and the fastener 23 is configured to engage an inside of the respective front sidewall 11A, 11B to clamp the front sidewall 11A, 11C between the flange 39 and the fastener 23.

The device 10 may also include a pair of clips 46 (e.g., a right clip and a left clip) extending outward from the respective front sidewall 11A, 11B forward of the oar connector 35. The clip 46 is configured to engage a portion of the handle 31 of the oar 30 to secure the oar 30 when not in use.

The repeated process of pulling the oars 30 backward (e.g., during the pull phase) and pushing the oars 30 forward (e.g., during the flex phase) moves the device 10 forward through the water. The continual forward movement is made possible by the adjusting the orientation of the oar scoops 32 by rotation of the oars 30 about the second axis or rotation 45 (FIG. 3) as the oar scoops 32 push against the water. The interconnection of the oar connectors 35 of the oars 30 and the oar saddles 20 keeps the oar scoops 32 under the water line during both the pull phase and the flex phase of the stroke.

The foregoing descriptions of specific illustrated embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A device for rowing training comprising:
   a hull comprising:
      a bottom; and,
      a front right sidewall, a back right sidewall, a front left sidewall and a back left sidewall defining said hull having a diamond shape that is symmetric about a major axis and a minor axis;
   a pair of oars connected to opposing sidewalls, each oar comprising a handle and an oar scoop disposed as an end of said handle:
      a right oar connected at a right intersection between said front right sidewall and said back right sidewall; and,
      a left oar connected at a left intersection between said front left sidewall and said back left sidewall;
   a pair of oar saddles:
      a right oar saddle connected to an upper edge of said right intersection, said right oar is connected to said right oar saddle; and,
      a left oar saddle connected to an upper edge of said left intersection, said left oar is connected to said left oar saddle;
   wherein said each oar saddle comprises:
      a front portion and a back portion disposed at a non-zero angle relative to each other matching an angle of an associated one of said right intersection and said left intersection; and,
      a slot extending upwardly into said front portion and said back portion and configured to receive said upper edge of said associated one of said right intersection and said left intersection;
   wherein said oars are configured to rotate about a first axis of rotation to move said oars during a pull phase and a flex phase of a rowing stroke; and,
   wherein said oars are configured to rotate about a second axis of rotation to change an angular orientation of said oar scoop in water during said pull phase and said flex phase.

2. The device of claim 1, wherein said bottom of said hull is flat.

3. The device of claim 1, wherein said oar comprises an oar connector disposed at an intermediate location on said handle, and said oar connector is connected to said oar saddle.

4. The device of claim 3, wherein:
   said oar saddle further comprises an upwardly extending tab comprising an aperture disposed therethrough; and,
   said oar connector comprises a T-shaped fitting comprising a collar portion configured to retain said handle of said oar and a stem portion configured to extend through said aperture.

5. The device of claim 4, wherein said oar connector is configured to rotate about said first axis of rotation relative to said oar saddle, and wherein said oar is configured to rotate about said second axis of rotation relative to said oar connector.

6. The device of claim 1, wherein a right oar is connected to said front right sidewall forward of a right intersection between said front right sidewall and said back right sidewall, and wherein a left oar is connected to said front left sidewall forward of a left intersection between said front left sidewall and said back left sidewall.

7. The device of claim 6, wherein said oar comprises an oar connector disposed at an intermediate location on said handle, and said oar connector is connected to said an associated one of said front right sidewall and said front left sidewall.

8. The device of claim 7, wherein:
   said front right sidewall and said front left sidewall each comprises an aperture disposed therethrough; and,
   said oar connector comprises a T-shaped fitting comprising a collar portion configured to retain said handle of said oar and a stem portion configured to extend through said aperture.

9. The device of claim 8, wherein said oar connector is configured to rotate about said first axis of rotation relative to said associated one of said front right sidewall and said front left sidewall, and wherein said oar is configured to rotate about said second axis of rotation relative to said oar connector.

10. The device of claim 1, wherein said oar scoop comprises a triangular prism body.

11. The device of claim 10, wherein said triangular prism body comprises at least one flat side.

12. The device of claim 1, wherein said oar scoop comprises at least one curved side.

13. A device for rowing training comprising:
- a hull comprising a flat bottom, a front right sidewall, a back right sidewall, a front left sidewall and a back left sidewall defining a diamond shape;
- a right oar saddle connected to a right intersection between said front right sidewall and said back right sidewall, wherein said right oar saddle comprises a front portion and a back portion disposed at a non-zero angle relative to each other matching an angle of said right intersection, a slot extending upwardly into said front portion and said back portion and configured to receive an upper edge of said right intersection, and an upwardly extending tab comprising an aperture disposed therethrough;
- a left oar saddle connected to a left intersection between said front left sidewall and said back left sidewall, wherein said left oar saddle comprises a front portion and a back portion disposed at a non-zero angle relative to each other matching an angle of said left intersection, a slot extending upwardly into said front portion and said back portion and configured to receive an upper edge of said left intersection, and an upwardly extending tab comprising an aperture disposed therethrough;
- a right oar comprising a handle, an oar scoop disposed as an end of said handle, a right oar connector disposed at an intermediate location on said handle and connected to said right oar saddle, wherein said right oar connector comprises a T-shaped fitting comprising a collar portion configured to retain said handle of said right oar and a stem portion configured to extend through said aperture of said right oar saddle; and,
- a left oar comprising a handle, an oar scoop disposed as an end of said handle, a left oar connector disposed at an intermediate location on said handle and connected to said left oar saddle, wherein said left oar connector comprises a T-shaped fitting comprising a collar portion configured to retain said handle of said left oar and a stem portion configured to extend through said aperture of said left oar saddle;
- wherein said right oar connector is configured to rotate about a first axis of rotation relative to said right oar saddle to move said right oar during a pull phase and a flex phase of a rowing stroke;
- wherein said left oar connector is configured to rotate about a first axis of rotation relative to said left oar saddle to move said left oar during said pull phase and said flex phase of said rowing stroke;
- wherein said right oar is configured to rotate about a second axis of rotation relative to said right oar connector to change an angular orientation of said oar scoop of said right oar in water during said pull phase and said flex phase; and,
- wherein said left oar is configured to rotate about a second axis of rotation relative to said left oar connector to change an angular orientation of said oar scoop of said left oar in said water during said pull phase and said flex phase.

14. The device of claim 13, wherein said oar scoop of said right oar and said left oar comprises a triangular prism body.

15. A device for rowing training comprising:
- a hull comprising a flat bottom, a front right sidewall, a back right sidewall, a front left sidewall and a back left sidewall defining a diamond shape;
- a right oar comprising a handle, an oar scoop disposed as an end of said handle, a right oar connector disposed at an intermediate location on said handle and connected to said front right sidewall forward of forward of a right intersection between said front right sidewall and said back right sidewall, wherein said right oar connector comprises a T-shaped fitting comprising a collar portion configured to retain said handle of said right oar and a stem portion configured to extend through an aperture disposed through said front right sidewall;
- a left oar comprising a handle, an oar scoop disposed as an end of said handle, a left oar connector disposed at an intermediate location on said handle and connected to said front left sidewall forward of a left intersection between said front left sidewall and said back left sidewall, wherein said left oar connector comprises a T-shaped fitting comprising a collar portion configured to retain said handle of said left oar and a stem portion configured to extend through an aperture disposed through said front left sidewall;
- a right clip extending from said front right sidewall and configured to engage said handle of said right oar; and,
- a left clip extending from said front left sidewall and configured to engage said handle of said left oar;
- wherein said right oar connector is configured to rotate about a first axis of rotation relative to said front right sidewall to move said right oar during a pull phase and a flex phase of a rowing stroke;
- wherein said left oar connector is configured to rotate about a first axis of rotation relative to said front left sidewall to move said left oar during said pull phase and said flex phase of said rowing stroke;
- wherein said right oar is configured to rotate about a second axis of rotation relative to said right oar connector to change an angular orientation of said oar scoop of said right oar in water during said pull phase and said flex phase; and,
- wherein said left oar is configured to rotate about a second axis of rotation relative to said left oar connector to change an angular orientation of said oar scoop of said left oar in said water during said pull phase and said flex phase.

16. The device of claim 15, wherein said oar scoop of said right oar and said left oar comprises a triangular prism body.

* * * * *